US012634728B2

(12) United States Patent
Suh

(10) Patent No.: US 12,634,728 B2
(45) Date of Patent: May 19, 2026

(54) METHOD AND APPARATUS FOR MONITORING DATA USAGE IN WIRELESS COMMUNICATION SYSTEM

(71) Applicant: Samsung Electronics Co., Ltd., Suwon-si (KR)

(72) Inventor: Dongeun Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

(21) Appl. No.: 17/962,081

(22) Filed: Oct. 7, 2022

(65) Prior Publication Data

US 2023/0114943 A1 Apr. 13, 2023

(30) Foreign Application Priority Data

Oct. 8, 2021 (KR) ......................... 10-2021-0134442

(51) Int. Cl.
*H04W 24/08* (2009.01)
*H04L 12/14* (2006.01)

(52) U.S. Cl.
CPC ......... *H04W 24/08* (2013.01); *H04L 12/1435* (2013.01)

(58) Field of Classification Search
CPC ............. H04W 28/0268; H04W 88/04; H04W 28/0875; H04W 28/0967; H04W 28/0975; H04W 72/02; H04W 72/40; H04W 76/14
See application file for complete search history.

(56) References Cited

U.S. PATENT DOCUMENTS

| | | | |
|---|---|---|---|
| 2019/0007500 A1 | 1/2019 | Kim et al. | |
| 2019/0207778 A1* | 7/2019 | Qiao | H04W 76/12 |
| 2019/0253917 A1* | 8/2019 | Dao | H04W 76/27 |
| 2020/0145538 A1* | 5/2020 | Qiao | H04M 15/85 |
| 2020/0336949 A1 | 10/2020 | Lee et al. | |
| 2021/0274436 A1* | 9/2021 | Sun | H04L 41/0806 |
| 2024/0163938 A1* | 5/2024 | Qiao | H04W 4/24 |
| 2024/0172047 A1* | 5/2024 | Alasti | H04W 24/02 |
| 2025/0212023 A1* | 6/2025 | Talebi Fard | H04L 41/14 |

OTHER PUBLICATIONS

3GPP, 3rd Generation Partnership Project, Technical Specification Group Services and System Aspects, Procedures for the 5G System, Stage 2 (Release 16), 3GPP TS 23.502 V16.0.0, XP055973285, Mar. 27, 2019.

(Continued)

*Primary Examiner* — Abdullahi Ahmed
(74) *Attorney, Agent, or Firm* — Jefferson IP Law, LLP

(57) ABSTRACT

A session management function (SMF) entity related to a first protocol data unit (PDU) session between a user equipment (UE) and a data network (DN) for a network slice, for monitoring data usage is provided. The SMF entity includes a transceiver, and at least one processor coupled with the transceiver and configured to determine to change at least one of a target user plane function (UPF) or a target SMF for connectivity between the UE and the DN for the network slice, transmit an update request message including accumulated data usage information for the first PDU session to a policy control function (PCF) configured to update remaining allowed usage, based on the determining to change at least one of the target UPF or the target SMF, and receive a response message from the PCF, the remaining allowed usage being updated based on the accumulated data usage information.

20 Claims, 8 Drawing Sheets

(56)     References Cited

OTHER PUBLICATIONS

Huawei et al., Clarification on Session Management Policy Data per PLMN, 3GPP TSG-WG SA2 Meeting #146E, e-meeting, S2-2105704, XP052055592, Elbonia, Aug. 16-27, 2021.

Nokia et al., Correcting AMF behaviour for Service Request that is not integrity protected, SA WG2 Meeting #132, S2-1903668, XP051748760, Apr. 8-12, 2019.

Extended European Search Report dated Aug. 7, 2024, issued in European Application No. 22878978.0-1206.

Huawei et al., 'Clarification on Session Management Policy Data per Plmn', S2-2105704, 3GPP TSGWG SA2 Meeting #146E e-meeting, Elbonia, Aug. 10, 2021, section 4.16.5.1.

Nokia et al., 'Usage monitoring for a user in SSC mode #3', S2-2106142, 3GPP TSG-WG SA2 Meeting # 146E e-meeting, Elbonia, Aug. 10, 2021, section 4.3.5.2.

Ericsson, 'SSC modes for FN-RG', S2-2105524, 3GPP TSG SA WG2 Meeting #146E, Elbonia, Aug. 10, 2021, section 4.4.2.

International Search Report and written opinion dated Jan. 20, 2023, issued in International Application No. PCT/KR2022/015207.

Korean Office Action dated Mar. 9, 2026, issued in Korean Application No. 10-2021-0134442.

3rd Generation Partnership Project, Technical Specification Group Services and System Aspects; Procedures for the 5G System (5GS); Stage 2 (Release 17), TS 23.502 v17.2.0, Sep. 24, 2021.

3rd Generation Partnership Project, Technical Specification Group Services and System Aspects; Policy and charging control framework for the 5G System (5GS); Stage 2 (Release 17), TS 23.503 v17.2.0, Sep. 24, 2021.

* cited by examiner

METHOD AND APPARATUS FOR MONITORING DATA USAGE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0134442, filed on Oct. 8, 2021, in the Korean Intellectual Property Office, the disclosure of which is incorporated by reference herein in its entirety.

BACKGROUND

1. Field

The disclosure relates to a method and apparatus for monitoring data usage in a wireless communication system.

2. Description of Related Art

Considering the development of wireless communication from generation to generation, technologies have been developed mainly for services targeting humans, such as voice calls, multimedia services, and data services. Connected devices which are on an explosive rise after the commercialization of $5^{th}$ generation (5G) communication systems are expected to be connected to communication networks. Examples of things connected to networks may include vehicles, robots, drones, home appliances, displays, smart sensors installed in various infrastructures, construction machinery, and factory equipment. Mobile devices may be expected to evolve in various form factors such as augmented reality glasses, virtual reality headsets, and holographic devices. In the $6^{th}$ generation (6G) era, efforts are being made to develop improved 6G communication systems, in order to provide various services by connecting hundreds of billions of devices and things. For this reason, 6G communication systems are called beyond 5G systems.

In 6G communication systems predicted to be realized around 2030, a peak data rate is 1 tera (i.e., 1,000 giga) bps, and a wireless latency time is 100 microseconds (μsec). That is, a data rate in 6G communication systems is 50 times higher than that in 5G communication systems, and a wireless latency time is reduced to ¹⁄₁₀.

In order to achieve such a high data rate and an ultra-low latency time, it is considered to implement 6G communication systems in a terahertz band (e.g., 95 gigahertz (GHz) to 3 terahertz (THz) bands). It is expected that, due to severer path loss and atmospheric absorption in terahertz bands than those in millimeter wave (mmWave) bands introduced in 5G, technologies capable of securing the signal transmission distance (i.e., coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, high dimensional spatial multiplexing using orbital angular momentum (OAM), and reconfigurable intelligent surface (RIS).

Also, in order to improve frequency efficiency and system network performance, the following technologies have been developed for 6G communication systems: full-duplex technology for allowing an uplink transmission and a downlink transmission to simultaneously use the same frequency resource at the same time, network technology for utilizing satellites, high-altitude platform stations (HAPS), and the like in an integrated manner, an improved network structure for supporting mobile base stations and the like and allowing network operation optimization and automation and the like, dynamic spectrum sharing technology via collision avoidance based on a prediction of spectrum usage, artificial intelligence (AI)-based communication technology for system optimization by utilizing AI from a designing phase and internalizing end-to-end AI support functions, and next-generation distributed computing technology for providing services of complexity beyond the limit of user equipment (UE) computing ability through super-high-performance communication and computing resources (such as mobile edge computing (MEC), clouds, and the like). In addition, through designing new protocols to be used in 6G communication systems, developing mechanisms for implementing a hardware-based security environment and safe use of data, and developing technologies for maintaining privacy, attempts to strengthen connectivity between devices, optimize a network, promote softwarization of network entities, and increase the openness of wireless communication are continuing.

It is expected that research and development of 6G communication systems in hyper-connectivity, including person to machine as well as machine to machine will allow the next hyper-connected experience. Particularly, it is expected that services such as truly immersive extended reality (XR), high-fidelity mobile hologram, and digital replica could be provided through 6G communication systems. Also, services such as remote surgery for security and reliability enhancement, industrial automation, and emergency response will be provided through 6G communication systems and applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide technology for effectively monitoring data usage by reflecting data used through an existing protocol data unit (PDU) session (i.e., an amount of data used to provide services to an UE through an existing protocol data unit (PDU) session) in a remaining allowed usage value, when a user plane function (UPF)/session management function (SMF) for a session and service continuity (SSC) mode 3 PDU session is changed, in a wireless communication system.

Additional aspects will be set forth in part in the description which follows and, in part, will be apparent from the description, or may be learned by practice of the presented embodiments.

In accordance with an aspect of the disclosure, a session management function (SMF) entity related to a first protocol data unit (PDU) session between a user equipment (UE) and a data network (DN) for a network slice, for monitoring data usage is provided. The SMF entity includes a transceiver, and at least one processor coupled with the transceiver and configured to determine to change at least one of a target user plane function (UPF) or a target SMF for connectivity between the UE and the DN for the network slice, transmit an update request message including accumulated data usage information for the first PDU session to a policy control function (PCF) configured to update remaining allowed usage, based on the determining to change the at least one of the target UPF or the target SMF, and receive a response message from the PCF, and wherein the remaining allowed usage is updated based on the accumulated data usage information.

The at least one processor may be further configured to transmit a PDU session modification command to an access and mobility management function (AMF), based on the determining to change the at least one of the target UPF or the target SMF, receive a response of the UE to the PDU session modification command from the AMF, and transmit the update request message to the PCF, based on the response of the UE to the PDU session modification command.

The at least one processor may be further configured to receive configuration information for setting a policy control request (PCR) trigger from the PCF, and the PCR trigger may be configured to, when an event of determining to change at least one of the target UPF or the target SMF occurs, report the event to the PCF.

The at least one processor may be further configured to in response to the determining to change the at least one of the target UPF or the target SMF, transmit, based on the PCR trigger, information indicating a determination to change the at least one of the target UPF or the target SMF, to the PCF, receive a data usage request message from the PCF, and transmit the update request message to the PCF, based on the data usage request message.

The at least one processor may be further configured to receive configuration information for setting a PCR trigger from the PCF, and the PCR trigger may be configured to, when an event of determining to change at least one of the target UPF or the target SMF occurs, report the event and the accumulated data usage information for the first PDU session to the PCF.

The at least one processor may be further configured to in response to the determining to change the at least one of the target UPF or the target SMF, transmit, based on the PCR trigger, the update request message including information indicating a determination to change the at least one of the target UPF or the target SMF, to the PCF.

The at least one processor may be further configured to receive the response message except monitoring configuration information from the PCF, when monitoring data usage for the first PDU session is deactivated.

The at least one processor may be further configured to receive a request message to stop monitoring data usage from the PCF.

In case that the target UPF is changed from a first UPF related to the first PDU session to a second UPF, a second PDU session with the second UPF may be established between the UE and the DN for the network slice, and the first PDU session is released after the second PDU session is established.

The at least one processor may be further configured to in case of determining to change only the target UPF from among the target UPF and the target SMF, select the second UPF as the target UPF.

In accordance with another aspect of the disclosure, a method, performed by a session management function (SMF) entity related to a first protocol data unit (PDU) session between a user equipment (UE) and a data network (DN) for a network slice, for monitoring data usage, is provided. The method includes determining to change at least one of a target user plane function (UPF) or a target SMF for connectivity between the UE and the DN for the network slice, transmitting an update request message including accumulated data usage information for the first PDU session to a policy control function (PCF) configured to update remaining allowed usage, based on the determining to change the at least one of the target UPF or the target SMF, and receiving a response message from the PCF, and wherein the remaining allowed usage is updated based on the accumulated data usage information.

The method further includes transmitting a PDU session modification command to an access and mobility management function (AMF), based on the determining to change the at least one of the target UPF or the target SMF, and receiving a response of the UE to the PDU session modification command from the AMF, and the transmitting of the update request message includes transmitting the update request message to the PCF, based on the response of the UE to the PDU session modification command.

The method further includes receiving configuration information for setting a policy control request (PCR) trigger from the PCF, and the PCR trigger may be configured to, when an event of determining to change at least one of the target UPF or the target SMF occurs, report the event to the PCF.

The method further includes in response to the determining to change the at least one of the target UPF or the target SMF, transmitting, based on the PCR trigger, information indicating a determination to change the at least one of the target UPF or the target SMF, to the PCF, and receiving a data usage request message from the PCF, and the transmitting of the update request message includes transmitting the update request message to the PCF, based on the data usage request message.

The method further includes receiving configuration information for setting a PCR trigger from the PCF, and the PCR trigger may be configured to, when an event of determining to change at least one of the target UPF or the target SMF occurs, report the event and the accumulated data usage information for the first PDU session to the PCF.

The transmitting of the update request message includes in response to the determining to change the at least one of the target UPF or the target SMF, transmitting, based on the PCR trigger, the update request message including information indicating a determination to change the at least one of the target UPF or the target SMF, to the PCF.

The receiving of the response message from the PCF includes receiving the response message except monitoring configuration information from the PCF, when monitoring data usage for the first PDU session is deactivated.

The method further includes receiving a request message to stop monitoring data usage from the PCF.

The method further includes in case of determining to change only the target UPF from among the target UPF and the target SMF, selecting the second UPF as the target UPF.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a flowchart for describing a method of updating data usage up to a present time point to a policy control function (PCF) when a session management function (SMF) determines that a protocol data unit (PDU) session anchor-user plane function (PSA-UPF) responsible for a PDU session operating in session and service continuity (SSC) mode 3 needs to be changed, according to an embodiment of the disclosure;

FIG. 6 is a flowchart for describing a data usage update procedure performed based on a PCR trigger of FIG. 5 in a PSA-UPF change procedure of an SSC mode 3 PDU session, according to an embodiment of the disclosure;

Throughout the drawings, it should be noted that like reference numbers are used to depict the same or similar elements, features, and structures.

DETAILED DESCRIPTION

Figure 2:
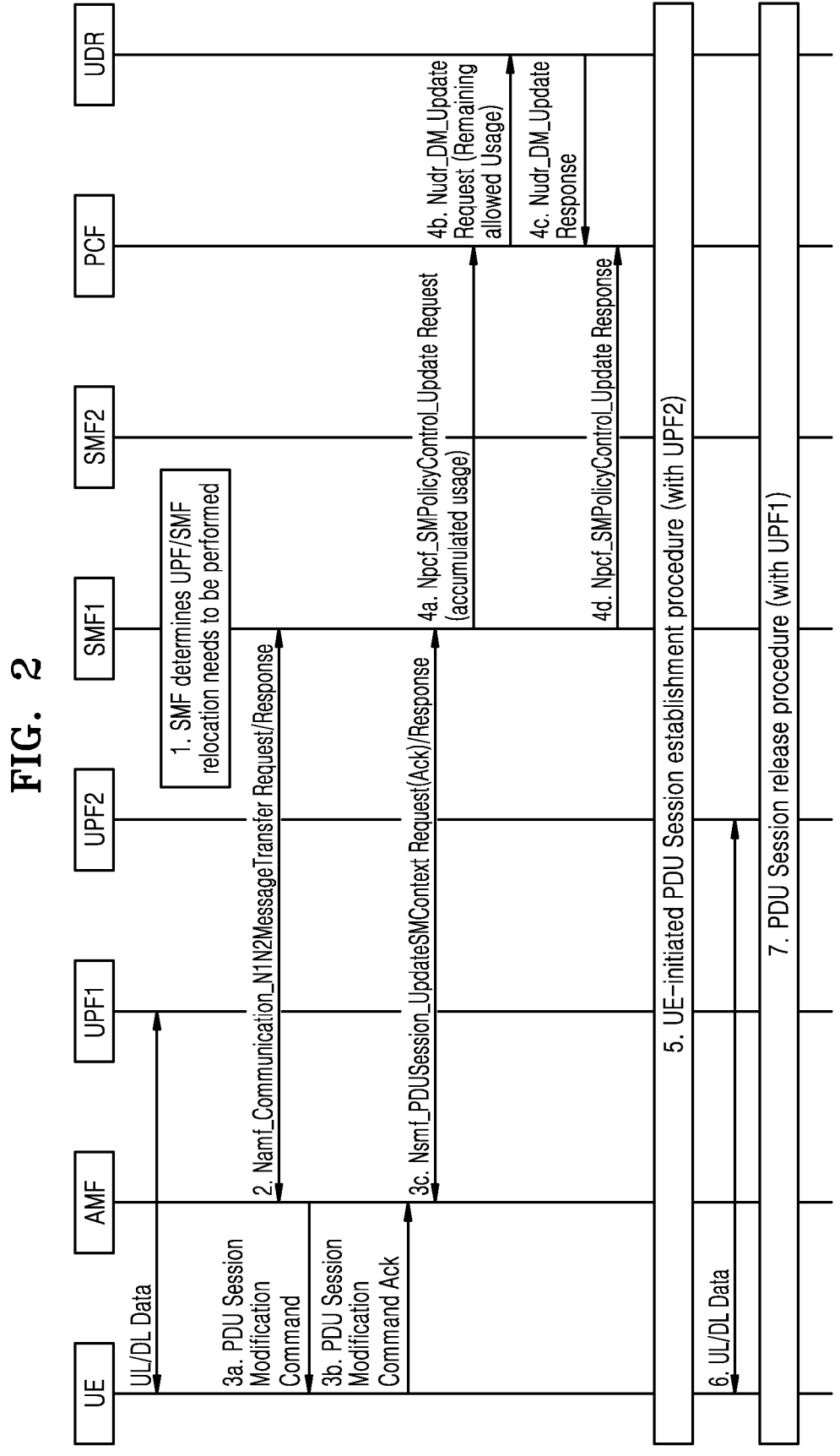
FIG. 2 is a flowchart for describing a method of late data usage update based on an existing SMF in a UPF/SMF change procedure of an SSC mode 3 PDU session, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements are exaggerated, omitted, or schematically illustrated in drawings. In addition, the size of each element may not substantially reflect its actual size. In each drawing, the same or corresponding element is denoted by the same reference numeral.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

The advantages and features of the disclosure, and methods of achieving the same, will become apparent with reference to embodiments of the disclosure described below in detail in conjunction with the accompanying drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the accompanying claims. In the specification, the same reference numerals denote the same elements.

It will be understood that each block of flowchart illustrations and combinations of blocks in the flowchart illustrations may be implemented by computer program instructions.

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" used in the present embodiment refers to a software or hardware component, such as a field-programmable gate array (FPGA) or an application-specific integrated circuit (ASIC), which performs certain tasks. However, the term " . . . unit" does not mean to be limited to software or hardware. A " . . . unit" may be configured to be in an addressable storage medium or may be configured to operate one or more processors. Thus, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and " . . . units" may be combined into fewer components and " . . . units" or may be further separated into additional components and " . . . units". Furthermore, components and " . . . units" may be implemented to operate one or more central processing units (CPUs) in a device or a secure multimedia card. Also, a " . . . unit" in an embodiment of the disclosure may include one or more processors.

Hereinafter, terms for identifying an access node, terms indicating network entities or terms indicating network functions, terms indicating messages, terms indicating an interface between network entities, and terms indicating various pieces of identification information used herein are exemplified for convenience of explanation. Accordingly, the disclosure is not limited to the terms described below, and other terms indicating objects having equal technical meanings may be used.

A 5$^{th}$ generation (5G) mobile communication network includes a 5G user equipment (UE), a 5G radio access network (RAN), and a 5G core network. The 5G core network includes network functions such as an access and mobility management function (AMF) that provides a mobility management function of a UE, a session management function (SMF) that provides a session management function, a user plane function (UPF) that performs a data transfer function, a policy control function (PCF) that provides a policy control function, a unified data management (UDM) that provides a data management function such as subscriber data and policy control data, and a unified data repository (UDR) that stores data of various network functions such as the UDM.

Recently, efficiently providing a network control function has emerged as an important issue in the 5G field, and various technologies are being developed. A data usage monitoring and control function is technology that controls a subscriber's data usage not to exceed remaining allowed usage. Data usage may be defined as a volume or time of user plane traffic. A PCF may perform monitoring data usage for each monitoring key or protocol data unit (PDU) session. The PCF may receive monitoring related information for each data network name (DNN) and single network slice selection assistance information (S-NSSAI) combination for a UE, maximum allowed usage, and remaining allowed usage-related information from a UDR when a PDU session is created. In this case, the PCF may additionally receive the above information for each DNN and S-NSSAI combination and for each monitoring key(s).

The PCF makes policy decisions on a PDU session in a PDU session establishment procedure. When the PCF decides to activate monitoring, the PCF may request an SMF to report data usage based on a time or volume threshold based on the information received from the UDR. When a set time elapses, data usage reaches a set volume, or a request is received from the PCF, the SMF may report aggregated data usage to the PCF. The PCF may calculate a value obtained by subtracting the aggregated data usage from remaining allowed usage (for each DNN and S-NS-SAI, or DNN, S-NSSAI, or monitoring key) for the UE as a new remaining allowed usage value and may store the new remaining allowed usage value in the UDR. When the PCF decides to continue monitoring, the PCF may again determine a time or volume threshold for the monitoring and may request the SMF to report data usage based on the time or volume threshold. When the remaining allowed usage value is close to or less than 0, the PCF may make other policy decisions for the PDU session(s) and may reflect the decisions in the SMF.

A session and service continuity (SSC) mode is technology for supporting session continuity in a 5G system. When a UE receives a message indicating that it is necessary to change a UPF and an SMF for a PDU session from the SMF for the PDU session operating in SSC mode 3, the UE may request to create a new PDU session that may replace the PDU session (i.e., a PDU session having the same DNN and S-NSSAI as the existing PDU session), and may release the existing PDU session when the new PDU session is created.

In this case, it is assumed that usage monitoring is activated for the PDU session operating in SSC mode 3. A remaining allowed usage value referenced by a PCF to make policy decisions for the new PDU session is a last updated value based on a usage report execution condition of the SMF for the existing PDU session. Accordingly, it is not guaranteed to reflect data used through the existing PDU session until that time point in the remaining allowed usage value. Accordingly, when the UPF/SMF for the PDU session of SSC mode 3 is changed, the data used through the existing PDU session should be appropriately reflected in the remaining allowed usage value, so that an appropriate remaining allowed usage value is referenced in a PDU session establishment procedure for the new PDU session.

When the UPF/SMF for the PDU session of SSC mode 3 is changed, a PCF for the new PDU session may be changed. In this case, two PCFs may update remaining allowed usage in one UDR may occur, and a subsequent request may overwrite the remaining allowed usage according to a previous update request. Accordingly, there is a demand for a method of solving the problems.

Figure 1:
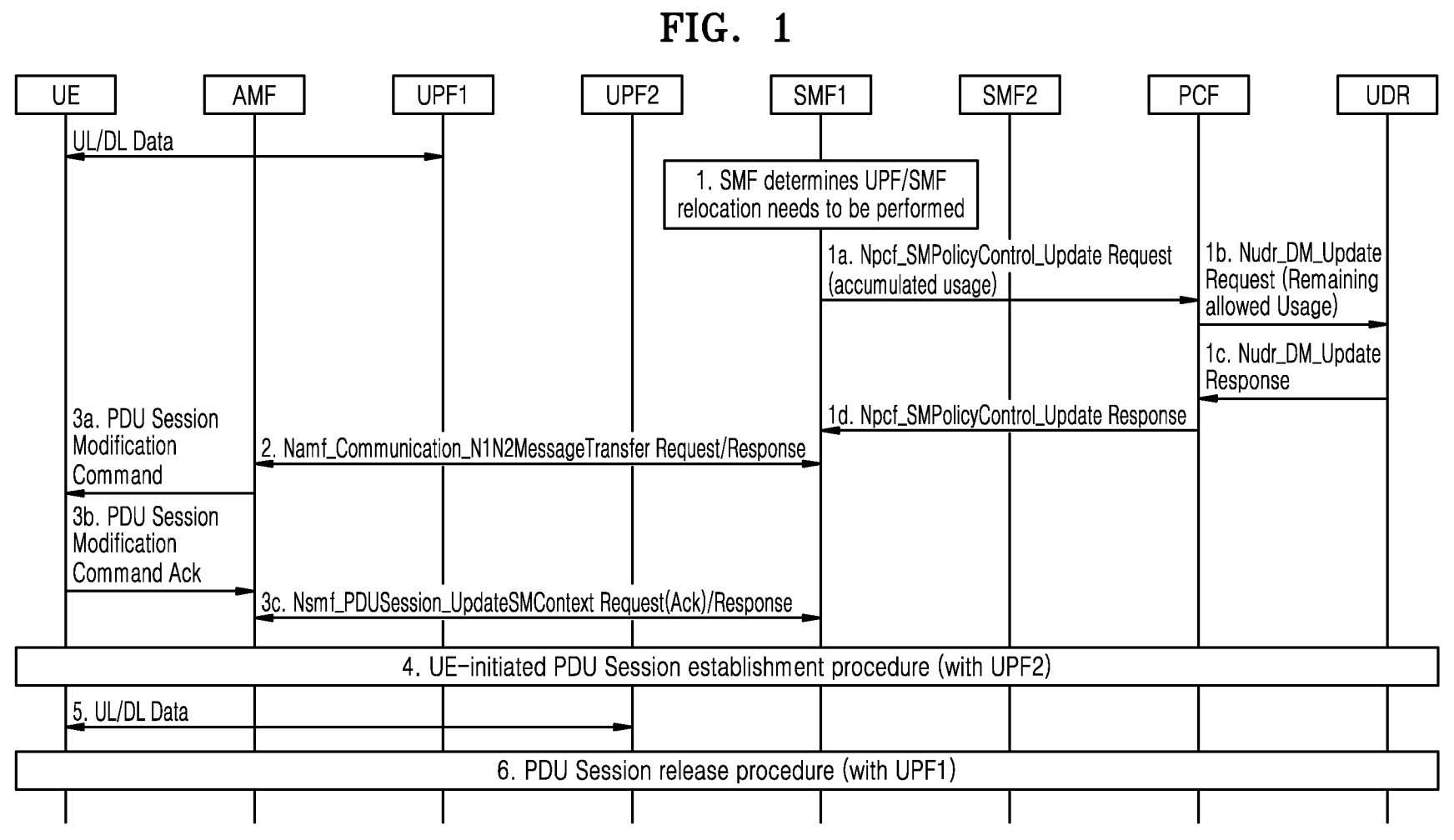

FIG. 1 is a flowchart for describing a method of updating data usage up to a present time point to a PCF when an SMF determines that a PDU session anchor (PSA)-UPF responsible for a PDU session operating in SSC mode 3 needs to be changed, according to an embodiment of the disclosure.

In operation 1 of FIG. 1, while a UE is transmitting/receiving data through an existing PDU session operating in SSC mode 3 using a UPF1 as a PSA-UPF, an SMF1 may determine that the PSA-UPF and/or an SMF for the existing PDU session (old PDU session) need to be changed.

In operation 1a of FIG. 1, when the existing PDU session corresponds to SSC mode 3 and it is determined that the PSA-UPF needs to be changed (or both the PSA-UPF and the SMF need to be changed), the SMF1 may include information about data used up to a present time point (i.e., accumulated usage) through the existing PDU session in an Npcf_SMPolicyControl_Update Request message and may transmit the same to a PCF.

In operation 1b of FIG. 1, the PCF may update a remaining allowed usage value to a value obtained by subtracting the accumulated usage in the received message from an existing remaining allowed usage value. The PCF may include the updated value in a Nudr_DM_Update Request message and may transmit the same to a UDR.

In operation 1c of FIG. 1, the UDR may transmit a Nudr_DM_Update Response message to the PCF in response to the request.

In operation 1d of FIG. 1, the PCF may transmit an Npcf_SMPolicyControl_Update Response message to the SMF in response to the request.

In operation 2 of FIG. 1, the SMF1 may transmit an amf_Communication_N1N2MessageTransfer Request message to an AMF. The message may include PDU session identifier (ID), SMF reallocation requested indication, and N1 SM container (PDU session modification command (cause, PCO (PDU session address lifetime value))). In this case, the PDU session ID indicates an ID of a PDU session in which SMF/UPF relocation is to be performed. The SMF reallocation requested indication indicates whether SMF reallocation is requested. The N1 SM container is a container for session-related information to be transmitted to the UE, and the cause in the PDU session modification command indicates that re-establishment for the existing PDU session is required (i.e., notifies that a PDU session establishment procedure for a new PDU session connected to the same data network (DN) as the existing PDU session is required). The PDU session address lifetime value is a value indicating a period for which a network maintains the existing PDU session, and may be delivered to an upper layer of the UE. The SMF may set and start a PDU session release timer based on the PDU session address lifetime value. In response thereto, the AMF may transmit a Namf_Communication_N1N2MessageTransfer Response message to the SMF1.

In operation 3a of FIG. 1, the AMF may transmit a NAS message to the UE. When the NAS message includes a release timer value in PDU session modification, the UE may deliver the release timer value to the upper layer (e.g., application layer) of the UE.

In operation 3b of FIG. 1, the UE may transmit a PDU session modification command Ack message to the AMF.

In operation 3c of FIG. 1, the AMF may transmit an Nsmf_PDUSession_UpdateSMContext Request message to the SMF1. In this case, the message includes N1 SM container (PDU session modification command ACK) received from a radio access network (RAN). In response thereto, the SMF1 may transmit a Nsmf_PDUSession_UpdateSMContext Response message to the AMF.

In operation 4 of FIG. 1, when the UE receives the PDU session modification command, the UE may decide to perform a PDU session establishment procedure for connection to the same data network (DN) as the DN of the existing PDU session. In the PDU session establishment procedure, the UE may request to create a new PDU session by transmitting a PDU session establishment request message to the AMF. In this case, by considering that the PDU session corresponds to SSC mode 3, the UE may include a new PDU session ID in the PDU session ID in the PDU session establishment request message, and may include the ID of the existing PDU session expected to be released in old PDU session ID.

When request type in the PDU session establishment request message is initial request and there is the old PDU session ID in the message, in operation 2, the AMF may operate as follows according to whether an SMF relocation request is received from the SMF1.

In operation 2 of FIG. 1, when the AMF does not receive the SMF relocation request from the SMF1, the AMF may select the SMF1, may include the old PDU session ID in an Nsmf_PDUSession_CreateSMContext Request message, and may transmit the same to the SMF1. When the request type in the message is initial request and there is the old PDU session ID in the message, the SMF1 may identify the existing PDU session to be released by using the old PDU session ID. The remaining procedures for creating the new PDU session may be performed, and in this case, the SMF1 may select a new UPF (i.e., UPF2) for the new PDU session.

In operation 2 of FIG. 1, when the AMF receives the SMF relocation request from the SMF1, the AMF may select a new SMF (i.e., SMF2) in the PDU session establishment procedure. The AMF may transmit the Nsmf_PDUSession_CreateSMContext Request message to the SMF2. The remaining procedures for creating the new PDU session may be performed, and in this case, the SMF2 may select the UPF (i.e., UPF2) for the new PDU session.

In operation 5 of FIG. 1, when the new PDU session is established, the UE may use an Internet protocol (IP) address/prefix associated with the new PDU session for a new traffic flow. Also, a PDU session via which the traffic flows are being transferred is changed from the existing PDU session to the new PDU session.

In operation 6 of FIG. 1, a PDU session release procedure for the existing PDU session may be performed by the SMF (i.e., SMF1) or the UE. When the PDU session release timer of the SMF1 first expires, a release procedure may be performed by the SMF1, and when the UE decides to release (release timer value in operation 3a) before the expiry of the PDU session release timer of the SMF1, a release procedure may be performed by the UE.

FIG. 2 is a flowchart for describing a method of late data usage update based on an existing SMF (i.e., an old SMF) in a UPF/SMF change procedure of an SSC mode 3 PDU session, according to an embodiment of the disclosure.

In operation 1 of FIG. 2, while a UE is transmitting/receiving data through an existing PDU session operating in SSC mode 3 using a UPF1 as a PSA-UPF, an SMF1 may determine that the PSA-UPF and/or an SMF for the existing PDU session (old PDU session) need to be changed.

In operation 2 of FIG. 2, the SMF 1 may transmit a Namf_Communication_N1N2MessageTransfer Request message to an AMF. The message may include PDU session ID, SMF reallocation requested indication, and N1 SM container (PDU session modification command (cause, PCO (PDU session address lifetime value))). In this case, the PDU session ID indicates an ID of a PDU session in which SMF/UPF relocation is to be performed. The SMF reallocation requested indication indicates whether SMF reallocation is requested. The N1 SM container is a container for session-related information to be transmitted to the UE, and the cause in the PDU session modification command indicates that re-establishment for the existing PDU session is required (i.e., notifies that a PDU session establishment procedure for a new PDU session connected to the same data network (DN) as the existing PDU session is required). The PDU session address lifetime value is a value indicating a period for which a network maintains the existing PDU session, and may be delivered to an upper layer of the UE. The SMF may set and start a PDU session release timer based on the PDU session address lifetime value. In response thereto, the AMF may transmit a Namf_Communication_N1N2MessageTransfer Response message to the SMF1.

In operation 3a of FIG. 2, the AMF may transmit a NAS message to the UE. When the NAS message includes a release timer value in PDU session modification, the UE may deliver the release timer value to the upper layer (e.g., application layer) of the UE.

In operation 3b of FIG. 2, the UE may transmit a PDU session modification command Ack message to the AMF.

In operation 3c of FIG. 2, the AMF may transmit an Nsmf_PDUSession_UpdateSMContext Request message to the SMF1. In this case, the message may include N1 SM container (PDU session modification command ACK) received from a radio access network (RAN). In response thereto, the SMF1 may transmit a Nsmf_PDUSession_UpdateSMContext Response message to the AMF.

In operation 4a of FIG. 2, when the SMF1 receives the PDU session modification command ACK message for an SSC mode 3 PDU session in operation 3c, and determines that the PSA-UPF needs to be changed (or both the PSA-UPF and the SMF need to be changed) in operation 1, the SMF1 may include information about data used up to a present time point (i.e., accumulated usage) in a Npcf_SM-PolicyControl_Update Request message and may transmit the same to a PCF.

In operation 4b of FIG. 2, the PCF updates a remaining allowed usage value to a value obtained by subtracting the accumulated usage in the received message from an existing remaining allowed usage value. The PCF may include the updated value in a Nudr_DM_Update Request message and may transmit the same to a UDR.

In operation 4c of FIG. 2, the UDR may transmit an Nudr_DM_Update Response message to the PCF in response to the request.

In operation 4d of FIG. 2, the PCF may transmit an Npcf_SMPolicyControl_Update Response message to the SMF1 in response to the request.

In operation 5 of FIG. 2, when the UE receives the PDU session modification command, the UE may decide to perform a PDU session establishment procedure for connection to the same DN as the DN of the existing PDU session. In the PDU session establishment procedure, the UE may request to create a new PDU session by transmitting a PDU session establishment request message to the AMF. In this case, by considering that the PDU session corresponds to SSC mode 3, the UE may include a new PDU session ID in the PDU session ID in the PDU session establishment request message, and may include the ID of the existing PDU session expected to be released in old PDU session ID.

When request type in the PDU session establishment request message is initial request and there is the old PDU session ID in the message, in operation 2, the AMF may operate as follows according to whether an SMF relocation request is received from the SMF1.

In operation 2 of FIG. 2, when the AMF does not receive the SMF relocation request from the SMF1, the AMF may select the SMF1, may include the old PDU session ID in an Nsmf_PDUSession_CreateSMContext Request message, and may transmit the same to the SMF1. When the request type in the message is initial request and there is the old PDU session ID in the message, the SMF1 may identify the existing PDU session to be released by using the old PDU session ID. The remaining procedures for creating the new PDU session may be performed, and in this case, the SMF1 may select a new UPF (i.e., UPF2) for the new PDU session.

In operation 2 of FIG. 2, when the AMF receives the SMF relocation request from the SMF1, the AMF may select a new SMF (i.e., SMF2) in the PDU session establishment procedure. The AMF may transmit the Nsmf_PDUSession_CreateSMContext Request message to the SMF2. The remaining procedures for creating the new PDU session may be performed, and in this case, the SMF2 may select the UPF (i.e., UPF2) for the new PDU session.

In operation 6 of FIG. 2, when the new PDU session is established, the UE may use an IP address/prefix associated with the new PDU session for a new traffic flow. Also, a PDU session via which the traffic flows are being transferred is changed from the existing PDU session to the new PDU session.

In operation 7 of FIG. 2, a PDU session release procedure for the existing PDU session may be performed by the SMF (i.e., SMF1) or the UE. When the PDU session release timer of the SMF1 first expires, a release procedure may be performed by the SMF1, and when the UE decides to release (release timer value in operation 3a) before the expiry of the PDU session release timer of the SMF1, a release procedure may be performed by the UE.

Figure 3:
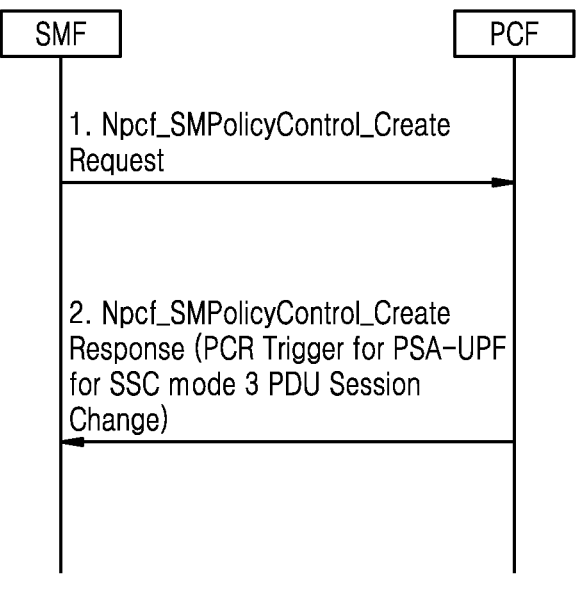
FIG. 3 is a flowchart for describing a policy control request (PCR) trigger setting procedure for notifying a decision to change a PSA-UPF of an SSC mode 3 PDU session, according to an embodiment of the disclosure.

FIG. 3 is a flowchart for describing a policy control request (PCR) trigger setting procedure for notifying a decision to change a PSA-UPF of an SSC mode 3 PDU session, according to an embodiment of the disclosure.

In operation 1 of FIG. 3, an SMF may transmit an Npcf_SMPolicyControl_Create Request message including information required for policy decision (PCC decision) to a PCF. The information may include type of PDU session and S-NSSAI. Also, the information may include information such as SSC mode 3 selected indication (information indicating that SSC mode 3 is selected).

In operation 2 of FIG. 3, the PCF may obtain various information for policy decision (e.g., receive subscriber information, etc. from a UDR) and may make policy decisions. After that, the PCF may include PCR trigger-related information for a PCR trigger operation (i.e., PCR trigger-related information that is needed for the SMF to notify the PCF when the corresponding event occurs), in a response message and may transmit the response message to the SMF. In this case, the response message may include PCR trigger for PSA-UPF for SSC mode 3 PDU session change. After the SMF receives the PCR trigger for PSA-UPF for SSC mode 3 PDU session change, when the SMF decides to change a PSA-UPF for an SSC mode 3 PDU session, the SMF may notify the decision to the PCF through an Npcf_SMPolicyControl_Update Request message.

Figure 4:
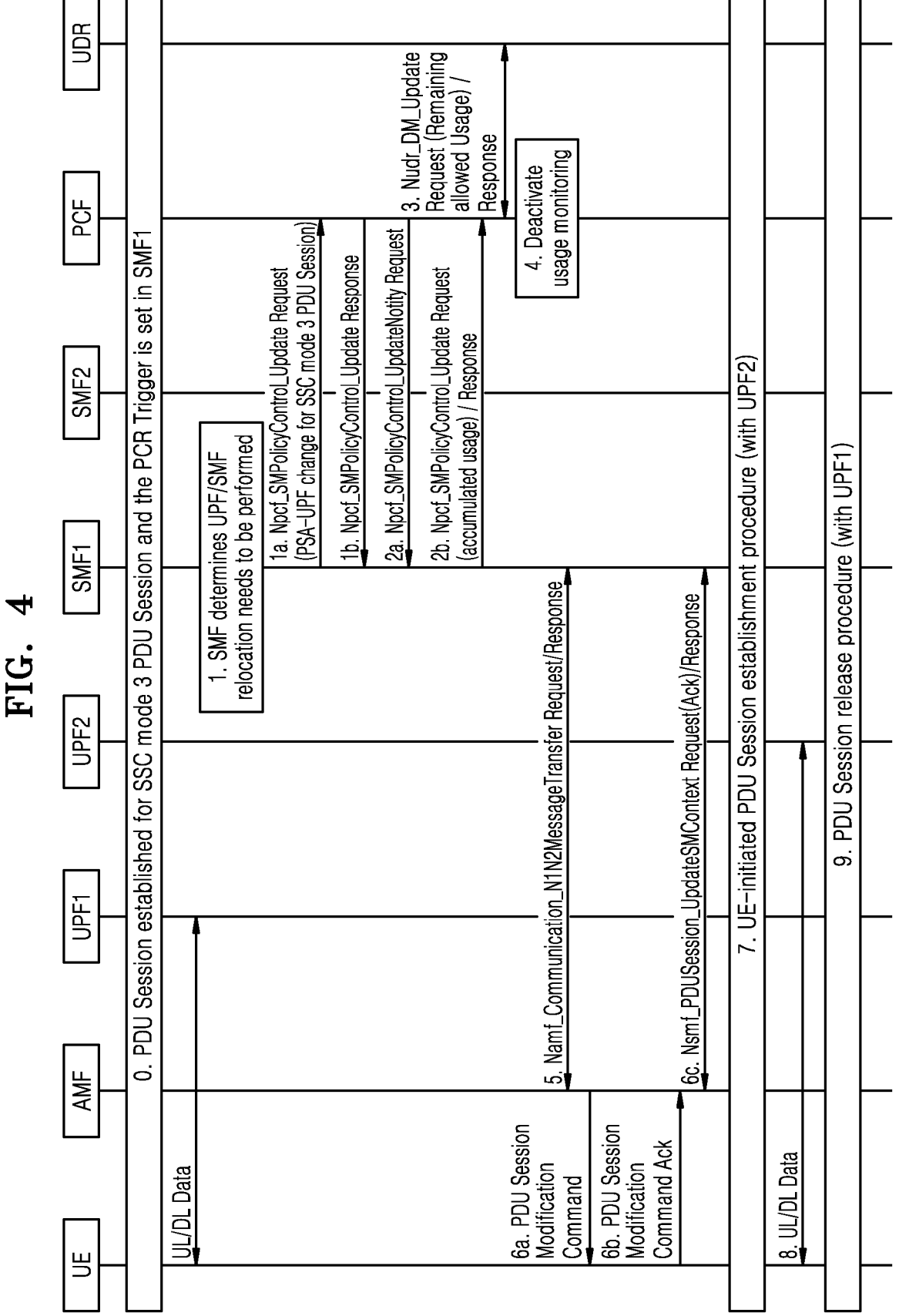
FIG. 4 is a flowchart for describing a data usage update procedure performed based on a PCR trigger of FIG. 3 in a PSA-UPF change procedure of an SSC mode 3 PDU session, according to an embodiment of the disclosure.

FIG. 4 is a flowchart for describing a data usage update procedure performed based on a PCR trigger of FIG. 3 in a PSA-UPF change procedure of an SSC mode 3 PDU session, according to an embodiment of the disclosure.

In operation 0 of FIG. 4, in a PDU session establishment procedure for an existing PDU session, a PCF may install policy control request (PCR) triggers for notifying a specific event in an SMF1.

In this case, the PCF may install a PCR trigger for PSA-UPF for SSC mode 3 PDU session change in the SMF1.

In operation 1 of FIG. 4, while a UE is transmitting/receiving data through the existing PDU session operating in SSC mode 3 using a UPF1 as a PSA-UPF, the SMF1 may determine that the PSA-UPF and/or an SMF for the existing PDU session (old PDU session) need to be changed.

In operation 1a of FIG. 4, the SMF1 may determine that the existing PDU session corresponds to SSC mode 3 and the PSA-UPF needs to be changed (or both the PSA-UPF and the SMF need to be changed). When the PCR trigger for PSA-UPF for SSC mode 3 PDU session change is installed in operation 0, the SMF1 may include PSA-UPF change for SSC mode 3 PDU session in an Npcf_SMPolicyControl_Update Request message and may transmit the same to the PCF.

In operation 1b of FIG. 4, the PCF may transmit an Npcf_SMPolicyControl_Update Response message to the SMF1 in response to the request.

In operation 2a of FIG. 4, when the PSA-UPF change for SSC mode 3 PDU session is included in the message of operation 1a, the PCF may identify that it is determined to change the PSA-UPF for the SSC mode 3 PDU session, and may transmit an Npcf_SMPolicyControl_UpdateNotify Request including information for requesting to report data usage, to the SMF1.

In operation 2b of FIG. 4, the SMF1 may include information about data used up to a present time point (i.e., accumulated usage) through the existing PDU session in a Npcf_SMPolicyControl_Update Request message and may transmit the same to the PCF. The PCF may transmit a response message to the SMF1. In this case, when operation 4 of FIG. 4 occurs before the present operation, the response message may not include information for requesting monitoring (e.g., threshold).

In operation 3 of FIG. 4, the PCF may update a remaining allowed usage value to a value obtained by subtracting the accumulated usage in the received message from an existing remaining allowed usage value. The PCF may include the updated value in a Nudr_DM_Update Request and may transmit the same to a UDR. The UDR may transmit a Nudr_DM_Update Response message to the PCF in response to the request.

In operation 4 of FIG. 4, when the PCF receives the PSA-UPF change for SSC mode 3 PDU session in operation 1*a*, the PCF may deactivate data usage monitoring for the existing PDU session.

After the deactivation, the PCF may not update the remaining allowed usage value of the UDR for the existing PDU session.

Also, in order that data usage monitoring for the existing PDU session isn't performed, the PCF may not include the information (e.g., threshold) for requesting monitoring in the response message transmitted to the SMF1 in operation 2*b* or may transmit a message for stopping monitoring to the SMF1.

In operation 5 of FIG. 4, the SMF1 may transmit a Namf_Communication_N1N2MessageTransfer Request message to an AMF. The message may include PDU session ID, SMF reallocation requested indication, and N1 SM container (PDU session modification command (cause, PCO (PDU session address lifetime value))). In this case, the PDU session ID indicates an ID of a PDU session in which SMF/UPF relocation is to be performed. The SMF reallocation requested indication indicates whether SMF reallocation is requested. The N1 SM container is a container for session-related information to be transmitted to the UE, and the cause in the PDU session modification command indicates that re-establishment for the existing PDU session is required (i.e., notifies that a PDU session establishment procedure for a new PDU session connected to the same data network (DN) as the existing PDU session is required). The PDU session address lifetime value is a value indicating a period for which a network maintains the existing PDU session, and may be delivered to an upper layer of the UE. The SMF1 may set and start a PDU session release timer based on the PDU session address lifetime value. In response thereto, the AMF may transmit a Namf_Communication_N1N2MessageTransfer Response message to the SMF1.

In operation 6*a* of FIG. 4, the AMF may transmit a NAS message to the UE. When the NAS message includes a release timer value in PDU session modification, the UE may deliver the release timer value to the upper layer (e.g., application layer) of the UE.

In operation 6*b* of FIG. 4, the UE may transmit a PDU session modification command Ack message to the AMF.

In operation 6*c* of FIG. 4, the AMF may transmit an Nsmf_PDUSession_UpdateSMContext Request message to the SMF1. In this case, the message may include N1 SM container (PDU session modification command ACK) received from a radio access network (RAN). In response thereto, the SMF1 may transmit an Nsmf_PDUSession_UpdateSMContext Response message to the AMF.

In operation 7 of FIG. 4, when the UE receives the PDU session modification command, the UE may decide to perform a PDU session establishment procedure for connection to the same DN as a DN of the existing PDU session. In the PDU session establishment procedure, the UE may request to create a new PDU session by transmitting a PDU session establishment request message to the AMF. In this case, by considering that the PDU session corresponds to SSC mode 3, the UE may include a new PDU session ID in the PDU session ID in the PDU session establishment request message, and may include the ID of the existing PDU session expected to be released in old PDU session ID.

When request type in the PDU session establishment request message is initial request and there is the old PDU session ID in the message, in operation 2, the AMF may operate as follows according to whether an SMF relocation request is received from the SMF1.

In operation 5 of FIG. 4, when the AMF does not receive the SMF relocation request from the SMF1, the AMF may select the SMF1, may include the old PDU session ID in an Nsmf_PDUSession_CreateSMContext Request message, and may transmit the same to the SMF1. When the request type in the message is initial request and there is the old PDU session ID in the message, the SMF1 may identify the existing PDU session to be released by using the old PDU session ID. The remaining procedures for creating the new PDU session may be performed, and in this case, the SMF1 may select a new UPF (i.e., UPF2) for the new PDU session.

In operation 5 of FIG. 4, when the AMF receives the SMF relocation request from the SMF1, the AMF may select a new SMF (i.e., SMF2) in the PDU session establishment procedure. The AMF may transmit the Nsmf_PDUSession_CreateSMContext Request message to the SMF2. The remaining procedures for creating the new PDU session may be performed, and in this case, the SMF2 may select the UPF (i.e., UPF2) for the new PDU session.

In operation 8 of FIG. 4, when the new PDU session is established, the UE may use an IP address/prefix associated with the new PDU session for a new traffic flow. Also, a PDU session via which the traffic flows are being transferred is changed from the existing PDU session to the new PDU session.

In operation 9 of FIG. 4, a PDU session release procedure for the existing PDU session may be performed by the SMF (i.e., SMF1) or the UE. When the PDU session release timer of the SMF1 first expires, a release procedure may be performed by the SMF1, and when the UE decides to release (release timer value delivered to the upper layer) before the expiry of the PDU session release timer of the SMF1, a release procedure may be performed by the UE.

Figure 5:
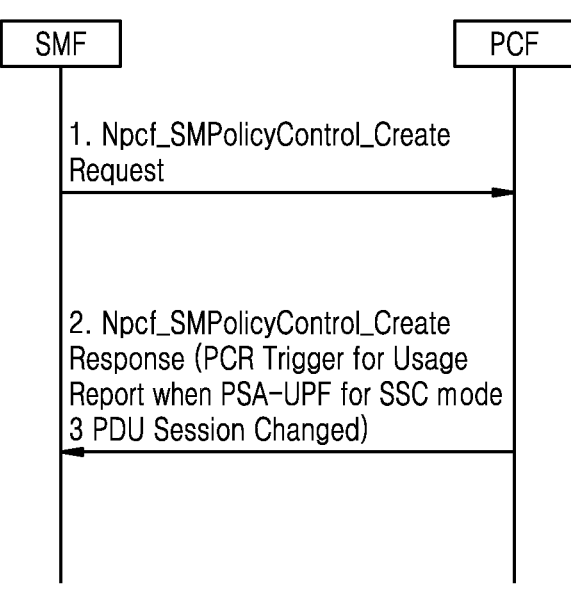
FIG. 5 is a flowchart for describing a PCR trigger setting procedure for notifying data usage and a decision to change a PSA-UPF of an SSC mode 3 PDU session, according to an embodiment of the disclosure.

FIG. 5 is a flowchart for describing a PCR trigger setting procedure for notifying data usage and a decision to change a PSA-UPF of an SSC mode 3 PDU session, according to an embodiment of the disclosure.

In operation 1 of FIG. 5, an SMF may transmit an Npcf_SMPolicyControl_Create Request message including information required for policy decision (PCC decision) to a PCF. The information may include type of PDU session and S-NSSAI. Also, the Npcf_SMPolicyControl_Create Request may include information such as SSC mode 3 selected indication (information indicating that SSC mode 3 is selected).

In operation 2 of FIG. 5, the PCF may obtain various information for policy decision (e.g., receive subscriber information, etc. from a UDR) and may make policy decisions. After that, the PCF may transmit a response message including PCR trigger-related information for a PCR trigger operation (i.e., PCR trigger-related information that is needed for the SMF to notify the PCF when the corresponding event occurs), to the SMF. In this case, the response message may include PCR trigger for usage report when PSA-UPF for SSC mode 3 PDU session changed. After the SMF receives the PCR trigger for usage report when PSA-UPF for SSC mode 3 PDU session changed, when the SMF decides to change a PSA-UPF for an SSC mode 3 PDU session, the SMF may include information about accumulated usage indicating an amount of data used up to a present time point and PSA-UPF change for SSC mode 3 PDU session for notifying the decision to change the PSA-UPF for the SSC mode 3 PDU session in a Npcf_SMPolicyControl_Update Request message and may transmit the same to the PCF.

Figure 6:
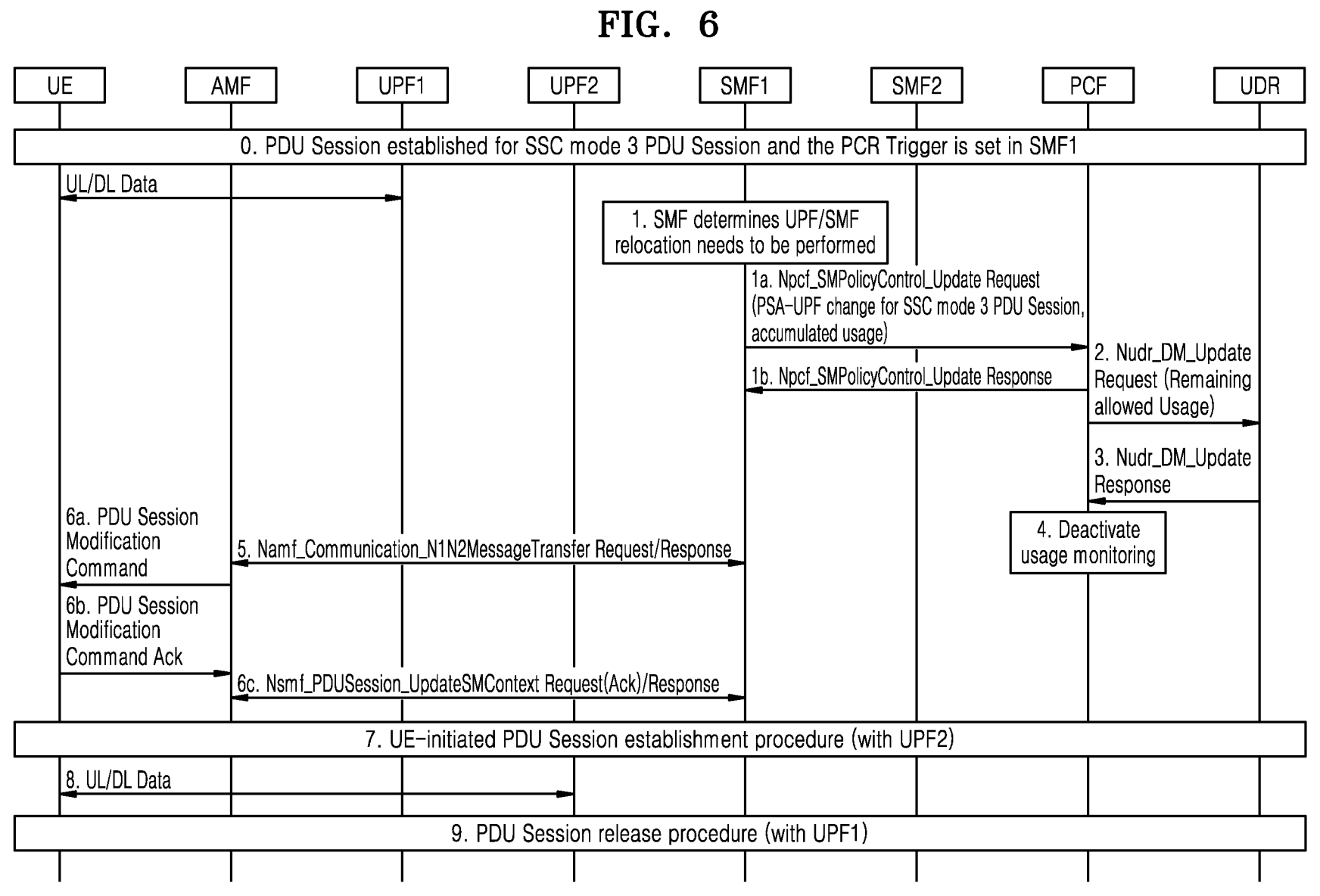

FIG. 6 is a flowchart for describing a data usage update procedure performed based on a PCR trigger of FIG. 5 in a PSA-UPF change procedure of an SSC mode 3 PDU session, according to an embodiment of the disclosure.

In operation 0 of FIG. 6, in a PDU session establishment procedure for an existing PDU session, a PCF may install policy control request (PCR) triggers for notifying a specific event in an SMF1. In this case, the PCF may install a PCR trigger for usage report when PSA-UPF for SSC mode 3 PDU session changed in the SMF1.

In operation 1 of FIG. 6, while a UE is transmitting/receiving data through the existing PDU session operating in SSC mode 3 using a UPF1 as a PSA-UPF, the SMF1 may determine that the PSA-UPF and/or an SMF for the existing PDU session (old PDU session) need to be changed.

In operation 1*a* of FIG. 6, the SMF 1 may determine that the existing PDU session corresponds to SSC mode 3 and the PSA-UPF needs to be changed (or both the PSA-UPF and the SMF need to be changed). When the PCR trigger for usage report when PSA-UPF for SSC mode 3 PDU session changed is installed in operation 0, the SMF1 may include an amount of data used up to a present time point (i.e., accumulated usage) and PSA-UPF change for SSC mode 3 PDU session in a Npcf_SMPolicyControl_Update Request message and may transmit the same to the PCF.

In operation 1*b* of FIG. 6, the PCF may transmit an Npcf_SMPolicyControl_Update Response message to the SMF1. In this case, when operation 4 occurs before the present operation, the response message does not include information for requesting monitoring (e.g., threshold).

In operation 2 of FIG. 6, the PCF may update a remaining allowed usage value to a value obtained by subtracting the accumulated usage in the received message from an existing remaining allowed usage value. The PCF may include the updated value in a Nudr_DM_Update Request message and may transmit the same to a UDR.

In operation 3 of FIG. 6, the UDR may transmit a Nudr_DM_Update Response message to the PCF in response to the request.

In operation 4 of FIG. 6, when the PCF receives the PSA-UPF change for SSC mode 3 PDU session in operation 1*a* of FIG. 6, the PCF deactivates data usage monitoring for the existing PDU session.

After the deactivation, the PCF does not update the remaining allowed usage value of the UDR for the existing PDU session.

Also, in order that data usage monitoring for the existing PDU session isn't performed, the PCF may not include the information (e.g., threshold) for requesting monitoring in the response message transmitted to the SMF1 in operation 1*b* or may transmit a message for stopping monitoring to the SMF1.

In operation 5 of FIG. 6, the SMF1 may transmit a Namf_Communication_N1N2MessageTransfer Request message to an AMF. The message may include PDU session ID, SMF reallocation requested indication, and N1 SM container (PDU session modification command (cause, PCO (PDU session address lifetime value))). In this case, the PDU session ID indicates an ID of a PDU session in which SMF/UPF relocation is to be performed. The SMF reallocation requested indication indicates whether SMF reallocation is requested. The N1 SM container is a container for session-related information to be transmitted to the UE, and the cause in the PDU session modification command indicates that re-establishment for the existing PDU session is required (i.e., notifies that a PDU session establishment procedure for a new PDU session connected to the same data network (DN) as the existing PDU session is required). The PDU session address lifetime value is a value indicating a period for which a network maintains the existing PDU session, and may be delivered to an upper layer of the UE. The SMF1 may set and start a PDU session release timer based on the PDU session address lifetime value. In response thereto, the AMF may transmit a Namf_Communication_N1N2MessageTransfer Response message to the SMF1.

In operation 6*a* of FIG. 6, the AMF may transmit a NAS message to the UE. When the NAS message includes a release timer value in PDU session modification, the UE may deliver the same to the upper layer (e.g., application layer) of the UE.

In operation 6*b* of FIG. 6, the UE may transmit a PDU session modification command Ack message to the AMF.

In operation 6*c* of FIG. 6, the AMF may transmit an Nsmf_PDUSession_UpdateSMContext Request message to the SMF1. In this case, the message may include the N1 SM container (PDU session modification command ACK) received from a radio access network (RAN). In response thereto, the SMF1 may transmit an Nsmf_PDUSession_UpdateSMContext Response message to the AMF.

In operation 7 of FIG. 6, when the UE receives the PDU session modification command, the UE may decide to perform a PDU session establishment procedure for connection to the same DN as a DN of the existing PDU session. In the PDU session establishment procedure, the UE may request to create a new PDU session by transmitting a PDU session establishment request message to the AMF. In this case, by considering that the PDU session corresponds to SSC mode 3, the UE may include a new PDU session ID in the PDU session ID in the PDU session establishment request message, and may include the ID of the existing PDU session expected to be released in old PDU session ID.

When request type in the PDU session establishment request message is initial request and there is the old PDU session ID in the message, in operation 2, the AMF may operate as follows according to whether an SMF relocation request is received from the SMF1.

In operation 5 of FIG. 6, when the AMF does not receive the SMF relocation request from the SMF1, the AMF may select the SMF1, may include the old PDU session ID in an Nsmf_PDUSession_CreateSMContext Request message, and may transmit the same to the SMF1. When the request type in the message is initial request and there is the old PDU session ID in the message, the SMF1 may identify the existing PDU session to be released by using the old PDU session ID. The remaining procedures for creating the new PDU session may be performed, and in this case, the SMF1 may select a new UPF (i.e., UPF2) for the new PDU session.

In operation 5 of FIG. 6, when the AMF receives the SMF relocation request from the SMF1, the AMF may select a new SMF (i.e., SMF2) in the PDU session establishment procedure. The AMF may transmit the Nsmf_PDUSession_CreateSMContext Request message to the SMF2. The remaining procedures for creating the new PDU session may be performed, and in this case, the SMF2 may select the UPF (i.e., UPF2) for the new PDU session.

In operation 8 of FIG. 6, when the new PDU session is established, the UE may use an IP address/prefix associated with the new PDU session for a new traffic flow. Also, a PDU session via which the traffic flows are being transferred is changed from the existing PDU session to the new PDU session.

In operation 9 of FIG. 6, a PDU session release procedure for the existing PDU session may be performed by the SMF (i.e., SMF1) or the UE. When the PDU session release timer of the SMF1 first expires, a release procedure may be performed by the SMF1, and when the UE decides to release (release timer value delivered to the upper layer) before the expiry of the PDU session release timer of the SMF1, a release procedure may be performed by the UE.

Figure 7:
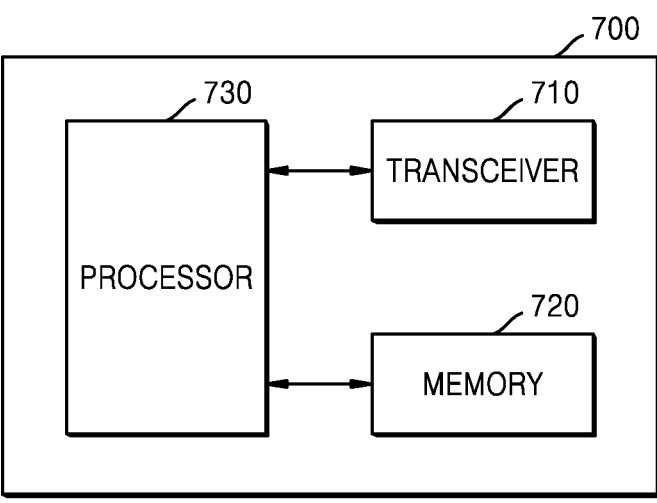
FIG. 7 is a diagram illustrating a configuration of a user equipment (UE), according to an embodiment of the disclosure.

FIG. 7 is a diagram illustrating a configuration of a UE, according to an embodiment of the disclosure.

Referring to FIG. 7, a UE 700 may include a transceiver 710, a memory 720, and a processor 730. The processor 730, the transceiver 710, and the memory 720 of the UE 700 may operate according to a communication method of the UE 700. However, elements of the UE 700 are not limited thereto. For example, the UE 700 may include more or fewer elements than those described above. In addition, the processor 730, the transceiver 710, and the memory 720 may be implemented in a single chip.

The transceiver 710 collectively refers to a receiver of the UE 700 and a transmitter of the UE, and may transmit and receive a signal to and from a base station or a network entity. The signal to be transmitted and received to and from the base station may include control information and data. To this end, the transceiver 710 may include a radio frequency (RF) transmitter for up-converting and amplifying a frequency of a transmitted signal and an RF receiver for low-noise amplifying a received signal and down-converting a frequency of the received signal. This is merely an example, and elements of the transceiver 710 are not limited to the RF transmitter and the RF receiver.

Also, the transceiver 710 may include a wired/wireless transceiver, and may include various elements for transmitting and receiving signals.

Also, the transceiver 710 may receive a signal through a wireless channel and may output the signal to the processor 730, and may transmit a signal output from the processor 730 through a wireless channel.

Also, the transceiver 710 may receive a communication signal and may output the communication signal to the processor, and may transmit a signal output from the processor to the network entity through a wired/wireless network.

The memory 720 may store a program and data required to operate the UE 700. Also, the memory 720 may store control information or data included in a signal obtained by the UE 700. The memory 720 may include a storage medium such as a read-only memory (ROM), a random-access memory (RAM), a hard disk, a compact disc ROM (CD-ROM), or a digital versatile disc (DVD), or a combination of storage media.

The processor 730 may control a series of processes in order for the UE 700 to operate according to the above embodiments of the disclosure. The processor 730 may include at least one processor. For example, the processor 730 may include a communication processor (CP) for performing control for communication and an application processor (AP) for controlling an upper layer such as an application program.

Figure 8:
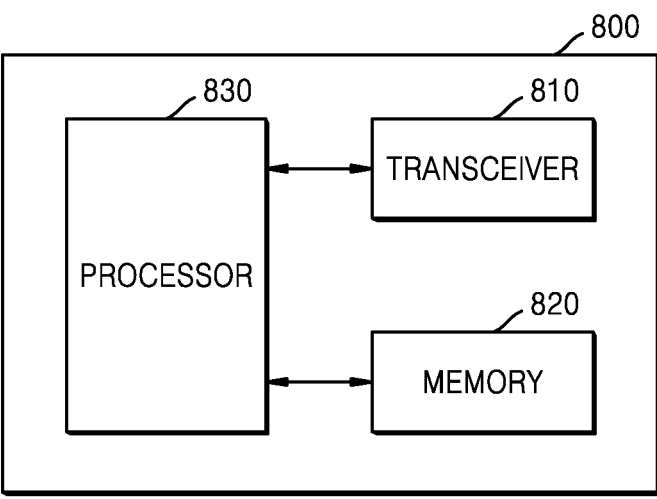
FIG. 8 is a diagram illustrating a configuration of a network entity, according to an embodiment of the disclosure.

FIG. 8 is a diagram illustrating a configuration of a network entity, according to an embodiment of the disclosure.

Referring to FIG. 8, a network entity 800 of the disclosure may include a transceiver 810, a memory 820, and a processor 830. The processor 830, the transceiver 810, and the memory 820 of the network entity 800 may operate according to a communication method of the network entity 800. However, elements of the network entity 800 are not limited thereto. For example, the network entity 800 may include more or fewer elements than those described above. In addition, the processor 830, the transceiver 810, and the memory 820 may be implemented in a single chip. The network entity 800 may include a network function (NF) such as an access and mobility management function (AMF), a session management function (SMF), a policy and charging function (PCF), a unified data management (UDM), or a user plane function (UPF). Also, the network entity 800 may include a base station.

The transceiver 810 may collectively refers to a receiver of the network entity 800 and a transmitter of the network entity 800, and may transmit and receive a signal to and from a UE or another network entity. In this case, the transmitted and received signal may include control information and data. To this end, the transceiver 810 may include an RF transmitter for up-converting and amplifying a frequency of a transmitted signal, and an RF receiver for low-noise amplifying a received signal and down-converting a frequency of the received signal. However, this is merely an example, and elements of the transceiver 810 are not limited to the RF transmitter and the RF receiver. The transceiver 810 may include a wired/wireless transceiver, and may include various elements for transmitting and receiving signals.

Also, the transceiver 810 may receive a signal through a communication channel (e.g., a wireless channel) and may output the signal to the processor 830, and may transmit a signal output from the processor 830 through a communication channel.

Also, the transceiver 810 may receive a communication signal and may output the communication signal to the processor, and may transmit a signal output from the processor to the UE or another network entity through a wired/wireless network.

The memory 820 may store a program and data required to operate the network entity 800. Also, the memory 820 may store control information or data included in a signal obtained by the network entity 800. The memory 820 may include a storage medium such as a ROM, a RAM, a hard disk, a CD-ROM, or a DVD, or a combination of storage media.

The processor 830 may control a series of processes in order for the network entity 800 to operate according to the above embodiments of the disclosure. The processor 830 may include at least one processor. Methods according to the claims of the disclosure or the embodiments described in the specification may be implemented by hardware, software, or a combination of hardware and software.

When the methods are implemented by software, a computer-readable storage medium storing one or more programs (software modules) may be provided. The one or more programs stored in the computer-readable storage medium are configured to be executed by one or more processors in an electronic device. The one or more programs include instructions for allowing the electronic device to execute the methods according to the claims or the embodiments of the disclosure.

The programs (software modules, software) may be stored in a random-access memory (RAM), a non-volatile memory including a flash memory, a read-only memory (ROM), an electrically erasable programmable ROM (EEPROM), a magnetic disc storage device, a compact disc- ROM (CD-ROM), a digital versatile disc (DVD) or other types of optical storage device, and/or a magnetic cassette. Alternatively, the programs may be stored in a memory including any combination of some or all of the above storage media. Also, a plurality of constituent memories may be provided.

The programs may also be stored in an attachable storage device which is accessible through a communication network such as the Internet, an intranet, a local area network (LAN), a wide area network (WAN), or a storage area network (SAN), or a combination thereof. Such a storage device may be connected through an external port to an apparatus performing an embodiment of the disclosure. Also, a separate storage device on a communication network may be connected to an apparatus performing an embodiment of the disclosure.

A method of monitoring data usage in a wireless communication system according to an embodiment of the disclosure may derive an accurate remaining allowed usage value even when a UPF/SMF for an SSC mode 3 PDU session is changed.

In detailed embodiments of the disclosure, components included in the disclosure have been expressed as singular or plural according to the detailed embodiments of the disclosure. However, the singular or plural form is selected appropriately for a condition provided for convenience of explanation, and the disclosure is not limited to the singular or plural form. An element expressed in a singular form may include a plurality of elements and elements expressed in a plural form may include a single element.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A session management function (SMF) entity related to a first protocol data unit (PDU) session between a user equipment (UE) and a data network (DN), for monitoring data usage, the SMF entity comprising:
    a transceiver; and
    at least one processor coupled with the transceiver and configured to:
        determine, while the UE is transmitting or receiving data through the first PDU session to the DN or from the DN, to change at least one of a target user plane function (UPF) or a target SMF,
        based on the determining to change at least one of the target UPF or the target SMF, transmit an update request message comprising accumulated data usage information for the first PDU session to a policy control function (PCF) configured to update remaining allowed usage, and
        receive a response message from the PCF in response to the update request message,
    wherein the remaining allowed usage is updated based on the accumulated data usage information.

2. The SMF entity of claim 1, wherein the at least one processor is further configured to:
    based on the determining to change at least one of the target UPF or the target SMF, transmit a PDU session modification command to an access and mobility management function (AMF),
    receive a response of the UE to the PDU session modification command from the AMF, and based on the receiving of the response of the UE to the PDU session modification command, transmit the update request message to the PCF.

3. The SMF entity of claim 1,
    wherein the at least one processor is further configured to:
        receive configuration information for setting a policy control request (PCR) trigger from the PCF, and
    wherein the PCR trigger is configured to, in response to an event of determining to change at least one of the target UPF or the target SMF occurring, report the event to the PCF.

4. The SMF entity of claim 3, wherein the at least one processor is further configured to:
    in response to the determining to change at least one of the target UPF or the target SMF, transmit, based on the PCR trigger, information indicating the determining to change at least one of the target UPF or the target SMF, to the PCF,
    receive a data usage request message from the PCF, and
    based on the data usage request message, transmit the update request message to the PCF.

5. The SMF entity of claim 1,
    wherein the at least one processor is further configured to:
        receive configuration information for setting a policy control request (PCR) trigger from the PCF, and
    wherein, the PCR trigger is configured to, in response to an event of determining to change at least one of the target UPF or the target SMF occurring, report the event and the accumulated data usage information for the first PDU session to the PCF.

6. The SMF entity of claim 5, wherein the at least one processor is further configured to:
    in response to the determining to change at least one of the target UPF or the target SMF, transmit, based on the PCR trigger, the update request message comprising information indicating the determining to change at least one of the target UPF or the target SMF, to the PCF.

7. The SMF entity of claim 1, wherein the first PDU session operates in a session and service continuity, SSC, mode 3.

8. The SMF entity of claim 1, wherein the accumulated data usage information for the first PDU session is associated with at least one network slice of the first PDU session.

9. The SMF entity of claim 1, wherein, in case that the target UPF is changed from a first UPF related to the first PDU session to a second UPF, a second PDU session with the second UPF is established between the UE and the DN for the network slice, and the first PDU session is released after the second PDU session is established.

10. The SMF entity of claim 9, wherein the at least one processor is further configured to:
    in case of determining to change only the target UPF from among the target UPF and the target SMF, select the second UPF as the target UPF.

11. A method, performed by a session management function (SMF) entity related to a first protocol data unit (PDU) session between a user equipment (UE) and a data network (DN), for monitoring data usage, the method comprising:
    determining, while the UE is transmitting or receiving data through the first PDU session to the DN or from the DN, to change at least one of a target user plane function (UPF) or a target SMF;
    based on the determining to change at least one of the target UPF or the target SMF, transmitting an update request message comprising accumulated data usage information for the first PDU session to a policy control function (PCF) configured to update remaining allowed usage; and receiving a response message from the PCF in response to the update request message, wherein the remaining allowed usage is updated based on the accumulated data usage information.

12. The method of claim 11, wherein the transmitting of the update request message comprises:

based on the determining to change at least one of the target UPF or the target SMF, transmitting a PDU session modification command to an access and mobility management function (AMF);

receiving a response of the UE to the PDU session modification command from the AMF; and based on the receiving of the response of the UE to the PDU session modification command, transmitting the update request message to the PCF.

13. The method of claim 11, further comprising:

receiving configuration information for setting a policy control request (PCR) trigger from the PCF, wherein the PCR trigger is configured to, in response to an event of determining to change at least one of the target UPF or the target SMF occurring, report the event to the PCF.

14. The method of claim 13, wherein the transmitting of the update request message comprises:

in response to the determining to change at least one of the target UPF or the target SMF, transmitting, based on the PCR trigger, information indicating the determining to change at least one of the target UPF or the target SMF, to the PCF;

receiving a data usage request message from the PCF; and based on the data usage request message, transmitting the update request message to the PCF.

15. The method of claim 11, further comprising:

receiving configuration information for setting a policy control request (PCR) trigger from the PCF, wherein the PCR trigger is configured to, in response to an event of determining to change at least one of the target UPF or the target SMF occurring, report the event and the accumulated data usage information for the first PDU session to the PCF.

16. The method of claim 15, wherein the transmitting of the update request message comprises, in response to the determining to change at least one of the target UPF or the target SMF, transmitting, based on the PCR trigger, the update request message comprising information indicating the determining to change at least one of the target UPF or the target SMF, to the PCF.

17. The method of claim 11, wherein the first PDU session operates in a session and service continuity, SSC, mode 3.

18. The method of claim 11, wherein the accumulated data usage information for the first PDU session is associated with at least one network slice of the first PDU session.

19. The method of claim 11, wherein, in case that the target UPF is changed from a first UPF related to the first PDU session to a second UPF, a second PDU session with the second UPF is established between the UE and the DN for the network slice, and the first PDU session is released after the second PDU session is established.

20. The method of claim 19, further comprising:

in case of determining to change only the target UPF from among the target UPF and the target SMF, selecting the second UPF as the target UPF.

* * * * *